United States Patent [19]
Quigley

[11] Patent Number: 5,897,737
[45] Date of Patent: Apr. 27, 1999

[54] METHOD FOR MAKING A CORE PLATE HAVING MULTIPLE FRICTION MATERIAL SEGMENTS

[75] Inventor: James R. Quigley, Lombard, Ill.

[73] Assignee: Borg-Warner Automotive, Inc., Sterling Heights, Mich.

[21] Appl. No.: 08/852,325

[22] Filed: May 7, 1997

[51] Int. Cl.⁶ ........................................ B32B 31/00
[52] U.S. Cl. ........................ 156/265; 156/257; 156/299; 156/518; 156/521; 156/251
[58] Field of Search ................... 156/265, 259, 156/261, 267, 269, 271, 257, 268, 515, 518, 521, 517, 251, 299

[56] References Cited

U.S. PATENT DOCUMENTS

| | | | |
|---|---|---|---|
| Re. 30,528 | 2/1981 | Off et al. | 156/202 |
| 4,260,047 | 4/1981 | Nels | 192/70.14 |
| 4,878,282 | 11/1989 | Bauer | 29/149.5 C |
| 5,094,331 | 3/1992 | Fujimoto et al. | 192/70.12 |
| 5,571,372 | 11/1996 | Miyaishi et al. | 156/515 |

FOREIGN PATENT DOCUMENTS

| | | | |
|---|---|---|---|
| 4-68491 | 11/1992 | Japan | 156/251 |

*Primary Examiner*—David A. Simmons
*Assistant Examiner*—Linda L. Gray
*Attorney, Agent, or Firm*—Emch, Schaffer, Schaub & Porcello, L.P.A.; Greg Dziegielewski

[57] ABSTRACT

A method for making a core plate (42) having multiple friction material segments (54) on the surface where the method includes the use of a die (24). Friction material (34) is first trimmed to conform to die (24) and is then fed into die (24). Die (24) then cuts friction material (34) to form a leading edge (57) where fibers in friction material (34) at leading edge (57) are positioned in a direction toward core plate (42). Friction material (34) is then fed through die (24) which cuts a trailing edge (55) in friction material (34) where fibers in friction material (34) at trailing edge (55) are positioned in a direction toward core plate (42). Cutting of trailing edge (55) is a common cut along trailing edge (55) of a leading segment (54) and leading edge (57) of an immediately following segment (54) such that formation of segments (54) is substantially scrapless with respect to friction material (34). Segment (54) is then positioned on an adhesive (43) on core plate (54) where the fibers at leading and trailing edges (57) and (55), respectively, are positioned in adhesive (43). Core plate (42) is then rotated and the above steps are repeated until a predetermined number of segments (54) are positioned on core plate (42).

11 Claims, 6 Drawing Sheets

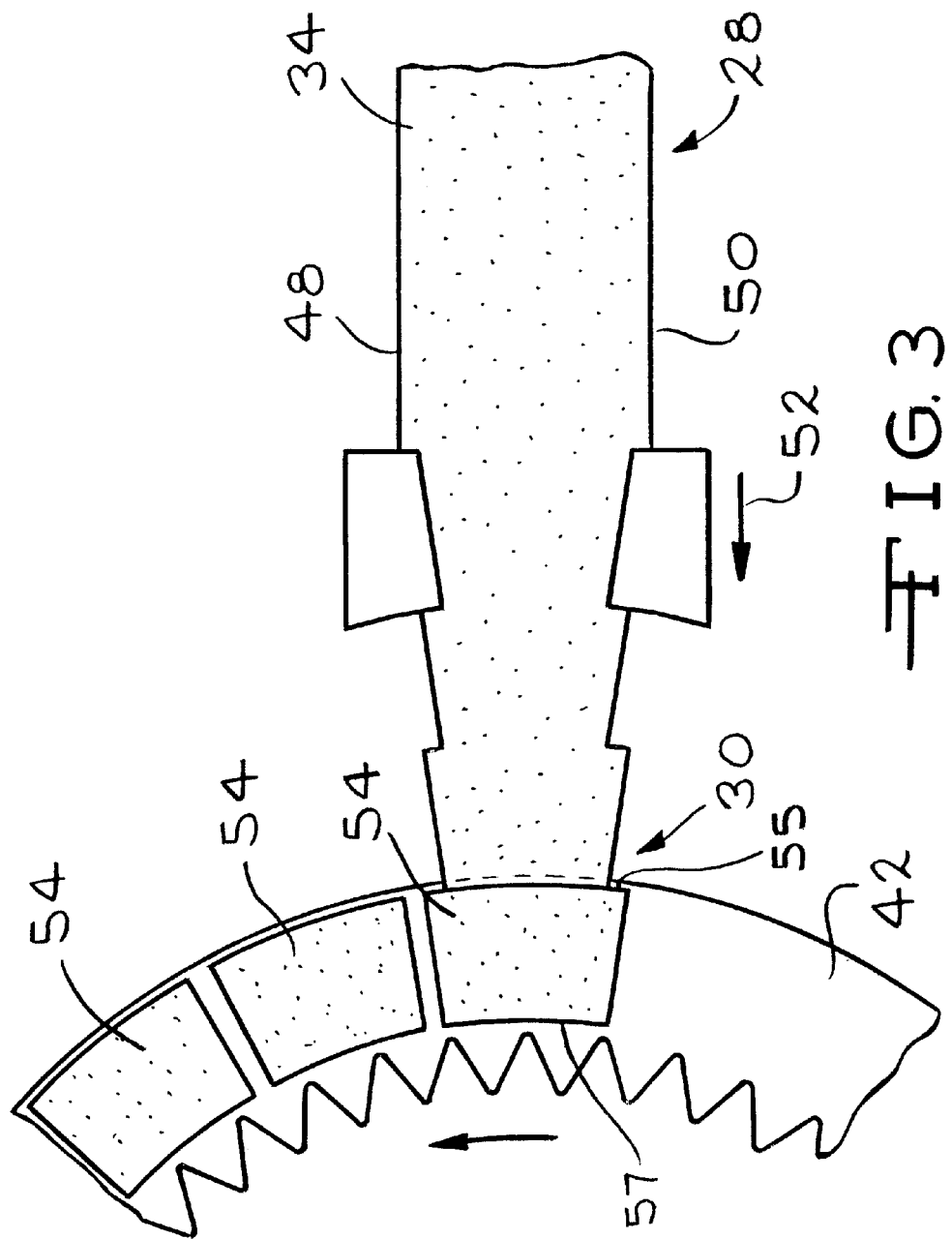

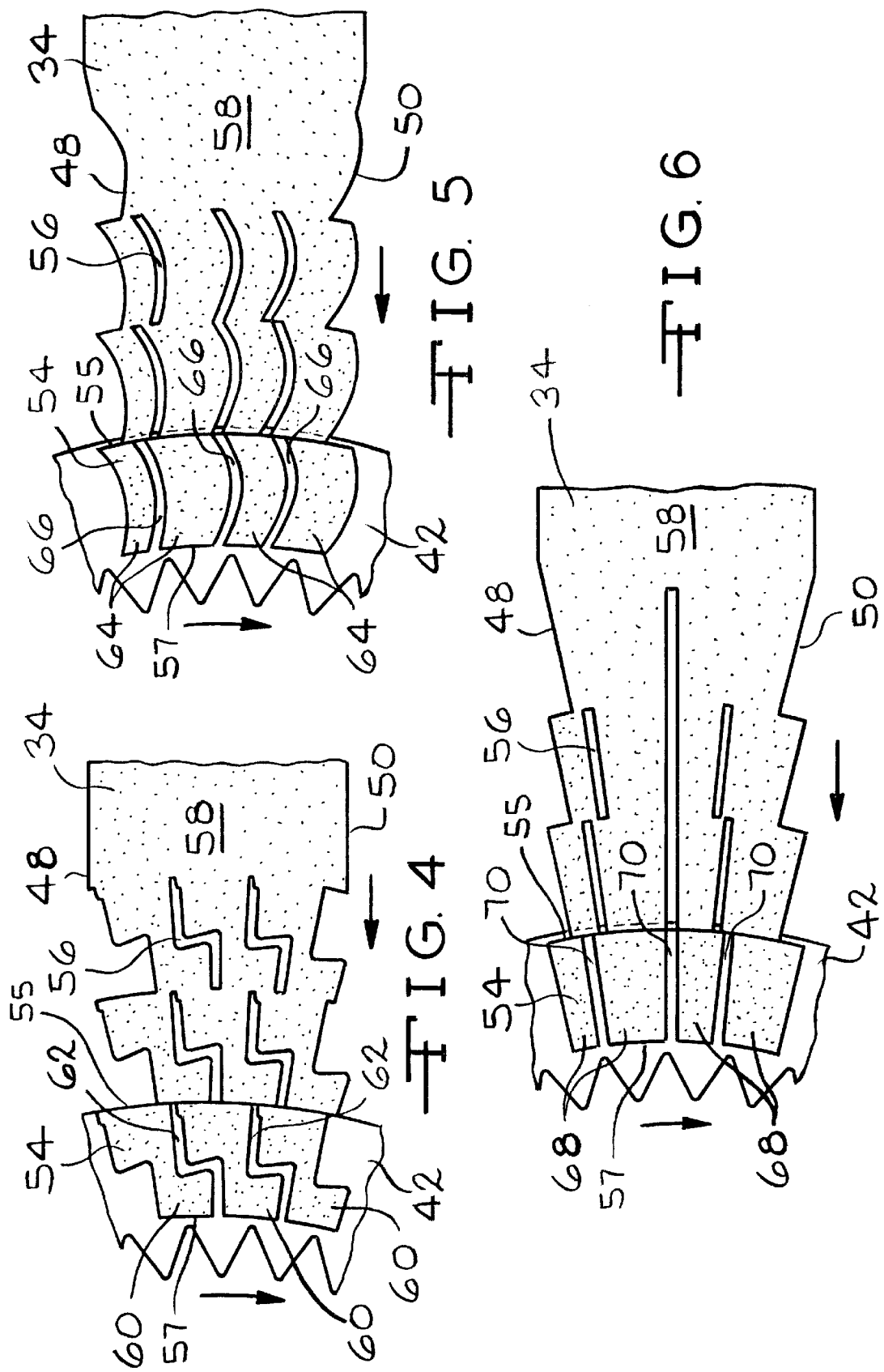

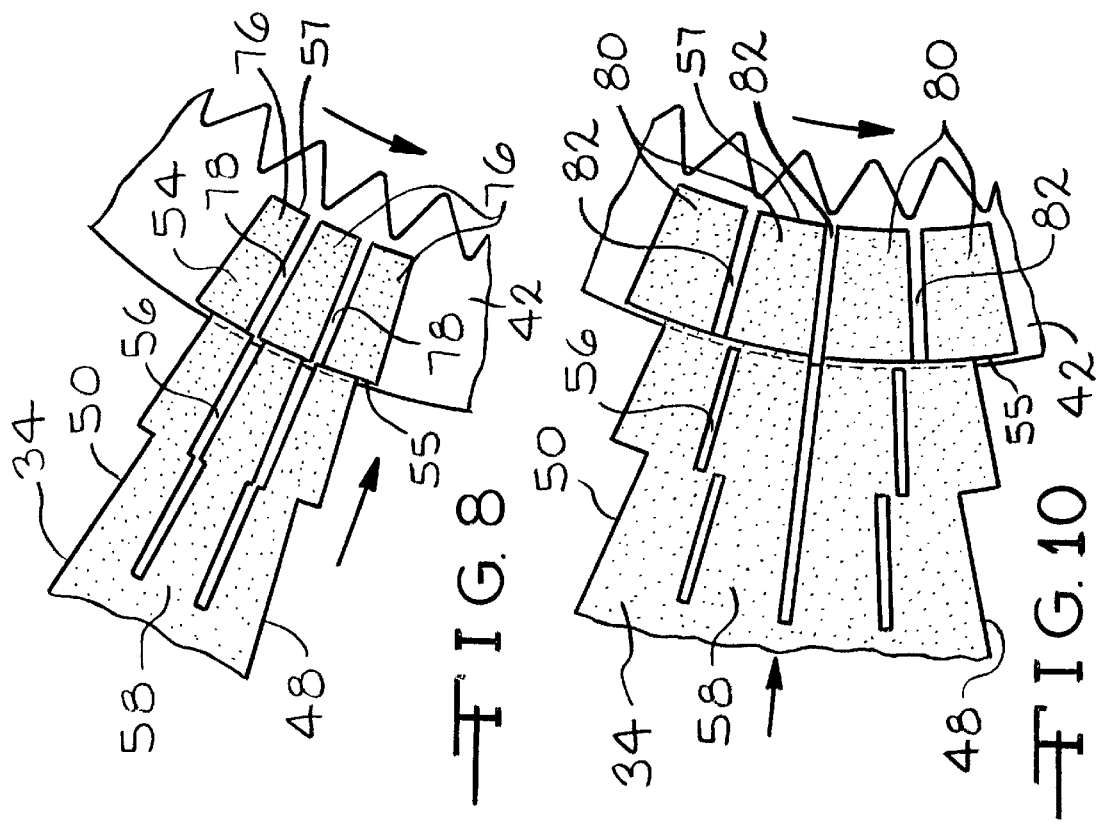
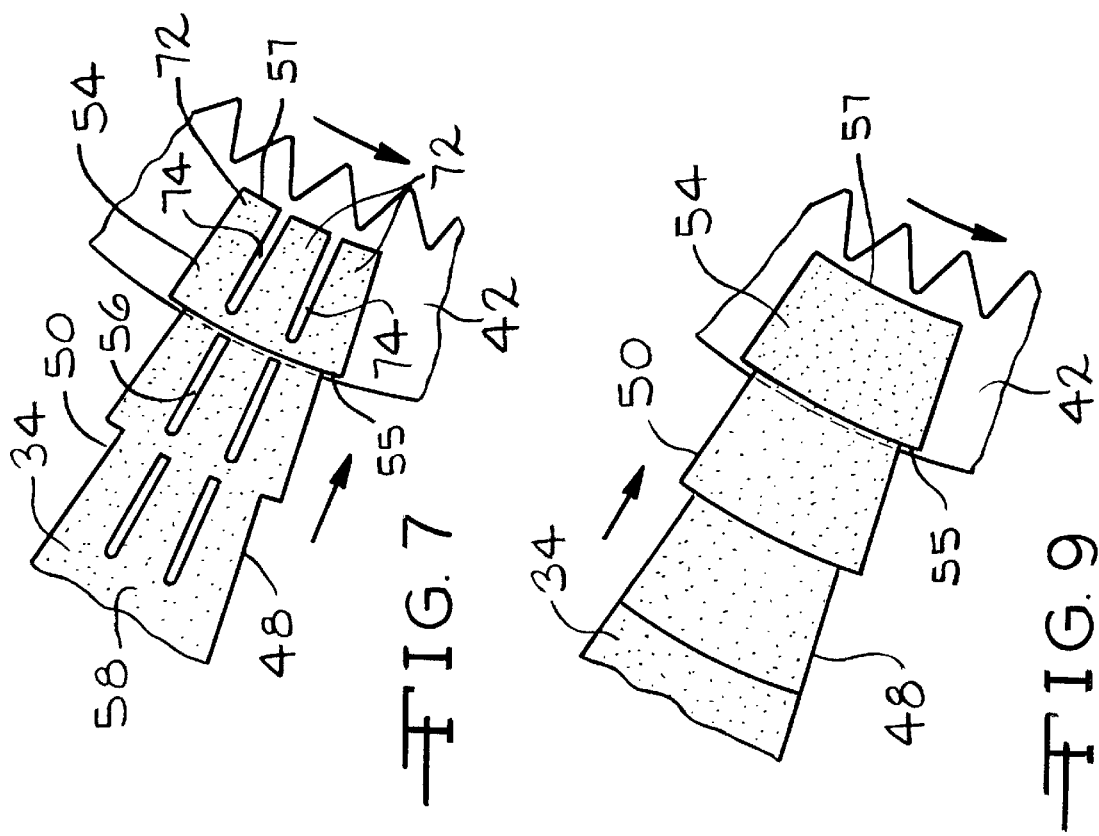

METHOD FOR MAKING A CORE PLATE HAVING MULTIPLE FRICTION MATERIAL SEGMENTS

BACKGROUND OF THE INVENTION

The present invention relates generally to a method for making a core plate having a friction material facing. More specifically, the invention is directed to a method for making a core plate having multiple friction material segments.

Apparatus and methods for producing core plates having segmented friction material are known in the art. It has been found that these prior art methods have various disadvantageous. First, the prior art methods are slow. Second, the prior art methods result in a great deal of waste. Finally, the friction material segments produced by the prior art methods have edges that are deficient.

Accordingly, there is a need for a method that is relatively fast, reduces waste and results in friction material segments that have superior edges. The present invention satisfies this need.

SUMMARY OF THE INVENTION

The present invention is directed to a method for making a core plate having multiple friction material segments. The method generally includes the steps of:

(a) positioning a core plate adjacent a die being in communication with a supply of friction material;

(b) cutting the friction material with the die to form multiple segments of friction material; and (c) positioning the segments on the core plate.

It is the primary object of the present invention to provide a relatively fast method for making a core plate having multiple friction material segments.

It is an important object of the present invention to reduce waste in a method for making a core plate having multiple friction material segments.

It is another important object of the present invention to provide a method for making a core plate having multiple friction material segments wherein the segments have superior edges.

Other objects and advantages of the present invention will become apparent to those skilled in the art upon a review of the following detailed description of the preferred embodiments and the accompanying drawings.

BRIEF DESCRIPTION OF THE DRAWINGS

FIG. 3 is a plan schematic view of a first embodiment segment according to the present invention;

FIG. 4 is a plan schematic view of a second embodiment segment according to the present invention;

FIG. 5 is a plan schematic view of a third embodiment segment according to the present invention;

FIG. 6 is a plan schematic view of a fourth embodiment segment according to the present invention;

FIG. 7 is a plan schematic view of a fifth embodiment segment according to the present invention;

FIG. 8 is a plan schematic view of a sixth embodiment segment according to the present invention;

FIG. 9 is a plan schematic view of a seventh embodiment segment according to the present invention;

FIG. 10 is a plan schematic view of an eighth embodiment segment according to the present invention.

DETAILED DESCRIPTION OF THE PREFERRED EMBODIMENTS

Figure 1:
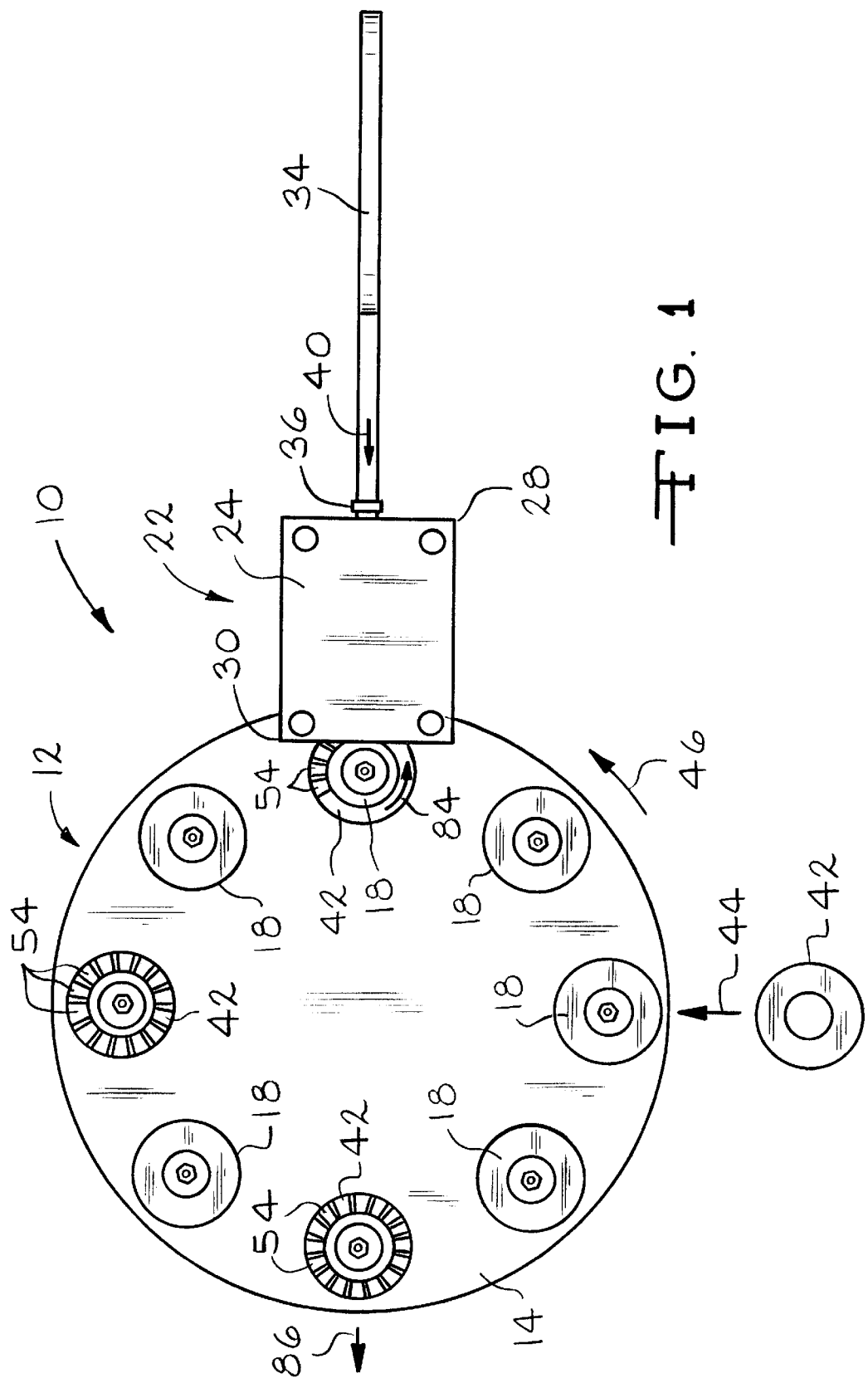
FIG. 1 is a plan schematic view of an apparatus that can be utilized to practice the method according to the present invention.

The preferred embodiments and best mode of the present invention will now be described in detail with reference being made to the drawings. The apparatus according to the present invention is indicated generally in the drawings by the reference number "10".

Figure 2:
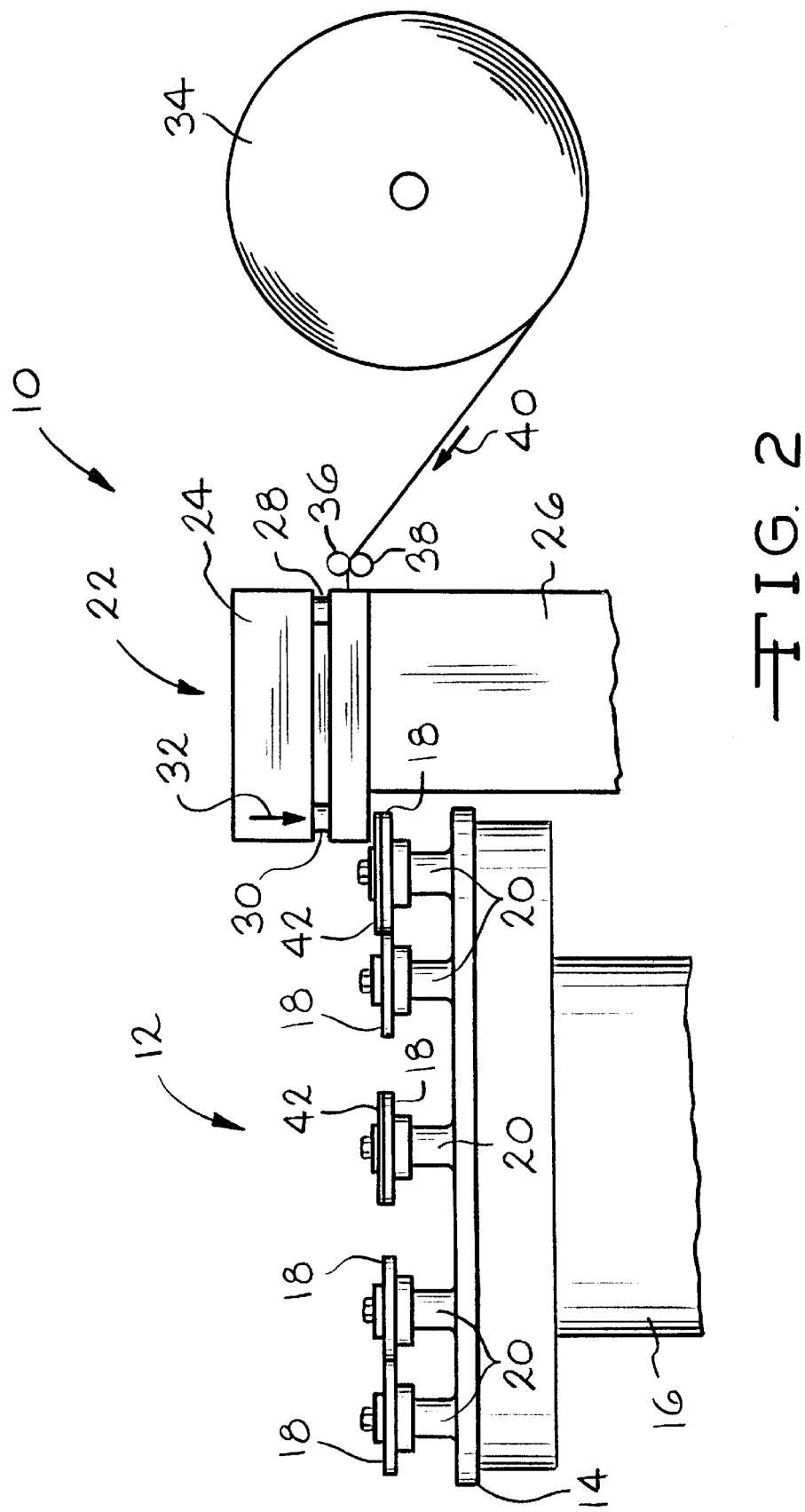
FIG. 2 is a side elevational schematic view of the apparatus shown in FIG. 1.

Referring to FIGS. 1 and 2, the apparatus 10 includes an indexing table 12 having a circular top 14 rotatably mounted on a stationary pedestal 16. The top 14 is in communication with, for example, a motor (not shown) for rotating the top 14 at a predetermined rate of speed. The rate of speed depends on the application. A plurality of core plate platforms 18 are rotatably mounted on spindles 20 that are positioned on the top 14 of the indexing table 12. Each of the platforms 18 is in communication with, for example, a motor (not shown) for rotating the platforms. In the present embodiment, there are eight platforms 18. However, the number of platforms 18 can vary depending on the application.

The apparatus 10 further includes a segment placement station 22 that is positioned in the present embodiment next to the indexing table 12. As shown in FIG. 2, the segment placement station 22 includes a die portion 24 supported by a support member 26. The die portion 24 includes an upstream end 28 and a downstream end 30. The die portion 24 is moveable in the direction indicated by the arrow 32 shown in FIG. 2. As described below, the die portion 24 includes a trimming and/or groove cutting area at the upstream end 28 and an end cutting and placement area at the downstream end 30.

As shown in FIG. 2, the die portion 24 is in communication with a roll of friction material 34. The friction material 34 is preslit to a predetermined width. In the preferred embodiment, the friction material 34 is preslit to a width of three to one inch with a precision width tolerance of ±0.015 inch. The friction material can be conventionally saturated or unsaturated depending on the application. The roll of friction material 34 is positioned on a conventional continuous motion dereeler (not shown) with a strip of the friction material 34 being feed into the die portion 24 by first and second guided pinch feed rolls 36 and 38. The pinch feed rolls 36 and 38 cooperate to pinch the friction material 34 and push feed the material through the die portion 24 in the direction indicated by the arrow 40 in FIG. 2. In the preferred embodiment, no feed progression holes are used with the feed length being determined by the pinch feed rolls that are servo driven and controlled to ±0.001 inch accuracy for the desired length of feed.

It should be understood that the above-described apparatus 10 is an example of a particular type of apparatus that can be utilized to practice the present method. Other types of apparatus can be used to practice the present method, such as an inline array apparatus.

Figure 11:
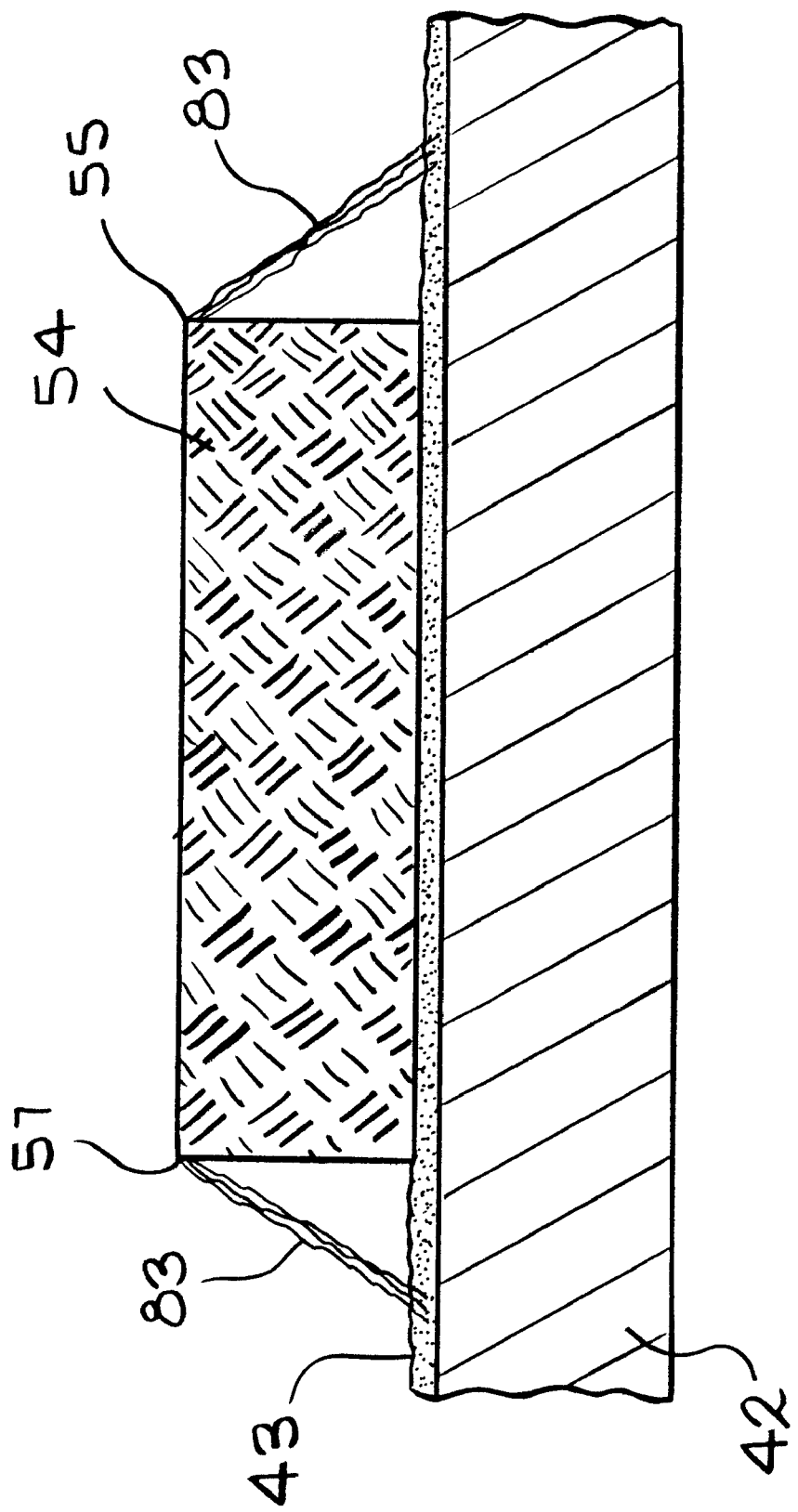
FIG. 11 is a cross-sectional view showing a segment positioned on a core plate.

The present method will now be described in detail. Referring to FIGS. 1, 2 and 11, a core plate 42, which has been conventionally preglued on at least one side with a thin layer of phenolic adhesive 43, is moved in the direction indicated by the arrow 44 shown in FIG. 1 onto a platform 18 of the indexing table 12. The top 14 of the indexing table 12 is rotated in the direction indicated by the arrow 46 shown in FIG. 1. This rotation positions the platform 18 and thus the core plate 42 adjacent the downstream end 30 of the die portion 24 of the segment placement station 22. When the core plate 42 is positioned adjacent the die portion 24, the first and second pinch feed rolls 36 and 38 cooperate to feed the friction material into the upstream end 28 of the die portion 24 at a predetermined speed and distance depending on the application. The friction material 34 then travels toward the downstream end 30 of the die portion 24. As previously described, the die portion 24 can move in the direction indicated by the arrow 32 shown in FIG. 2. When the die portion 24 moves in the downward direction, the upstream end 28 of the die trims the edges 48 and 50 of the friction material 34 as shown in FIG. 3. The edges 48 and 50 are trimmed to exact die required width. This width varies with tooling. However, for any given tool the width is fixed to eliminate adjustment. The trimmed friction material 34 then travels in the direction indicated by the arrow 52 in FIG. 3 to the downstream end 30 of the die portion 24. At the downstream end 30 of the die portion 24, a segment 54, which is also known as a "keystone segment", is cut from a length of friction material 34. During the downward movement of the die portion 24, as shown in FIGS. 2 and 11, the die portion positions the segment 54 on the adhesive 43 of the core plate 42. It should be understood that many adhesive combinations are possible. As shown in FIGS. 3–11, the cutting of the segment 54 is scrapless because the same cut is used on the outside radius or trailing edge 55 of the parted material as used on the inside radius or leading edge 57 of the next segment to be cut.

Referring to FIGS. 4–10, various embodiments of the segment 54 are shown. Referring to FIG. 4, the upstream end 28 of the die portion 24 can trim the edges 48 and 50 of the friction material 34 as shown. Flow grooves 56 can be molded or cut in the center 58 of the friction material 34. The grooves 56 can have open ends, as shown in FIG. 4, or closed ends, as shown in FIG. 7. The closed ends of the grooves 56 can be either on the inside diameter or the outside diameter of the segment 54 depending on the application. The grooves 56 can be asymmetrical, straight, or curved depending on the application. In the embodiment shown in FIG. 4, the segment 54 has three Z-shaped segment portions 60 with two Z-shaped open end grooves 62.

The other embodiments of the segment 54 can be described as follows:

FIG. 5 shows a segment 54 having four irregular curved segment portions 64 with three curved grooves 66;

FIG. 6 shows a segment 54 having four irregular straight segment portions 68 with three open end straight grooves 70;

FIG. 7 shows a segment 54 having three regular straight segment portions 72 with two closed end straight grooves 74;

FIG. 8 shows a segment 54 having three regular straight segment portions 76 with two open end straight grooves 78;

FIG. 9 shows a solid segment 54; and

FIG. 10 shows a segment 54 having four regular straight segment portions 80 with three open end straight grooves 82.

As shown in FIG. 11, the present method allows the cut portions to be completely through the segments 54 down to the core plate 42. This makes the core plate 42 robust to rotation in either direction because the fibers 83 of the segments 54 are cut in a downward direction into the adhesive 43 on both the leading edge 57 and the trailing edge 55 of the segment relative to the travel of the segment. This tends to reduce breakage of the fibers 83.

The cutting of the friction material 34 into segments 54 as described above allows additional effectiveness in either greater oil holding capacity or the same oil holding capacity with greater surface area during use of the core plate 42. The same oil capacity groove with greater material mating surface area can be made by cutting a groove to the full material depth to the core plate 42 with a narrower width of cut.

It should be understood that the above-described embodiments are for example purposes. The present method can utilize friction material segments 54 having a wide variety of shapes, combinations, segment portions and grooves depending on the application.

Referring again to FIGS. 1 and 2, after the downstream end 30 of the die portion 24 positions a segment 54 of friction material 34 on a core plate 42, the platform 18 on which the core plate is positioned rotates in the direction indicated by the arrow 84 shown in FIG. 1. As the core plate 42 is rotated, a predetermined number of segments 54 are positioned on the core plate. In a preferred embodiment, eight segments 54 are positioned on the core plate 42. Once a full compliment of segments 54 is positioned on the core plate 42, the top 14 of the indexing table 12 is rotated in the direction indicated by the arrow 46 so that the next core plate is positioned adjacent the downstream end 30 of the die portion 24. As shown in FIG. 1, a completed core plate having multiple segments 54 of friction 34 is moved from the indexing table 12 in the direction indicated by the arrow 86.

It has been found that the present method is relatively fast as compared to prior apparatus and methods. The method reduces waste of friction material 34. Further, the method provides superior cutting of the friction material 34.

Many revisions may be made to the above described embodiments, without departing from the scope of the invention or from the following claims.

I claim:

1. A method for making a core plate having multiple friction material segments, including the steps of:

(a) positioning a core plate (42) adjacent a die (24), said core plate (42) having adhesive (43) thereon, said die (24) being in communication with a supply of friction material (34) containing fibers (83);

(b) trimming said friction material (34) to conform to said die (24);

(c) cutting a leading edge (57) of said friction material (34) with said die (24) wherein said fibers (83) contained in said friction material (34) at said leading edge (57) are positioned in a direction toward said core plate (42);

(d) feeding said friction material (34) after said step (c) through said die (24);

(e) cutting a trailing edge (55) of said friction material (34) with said die (24) to form a segment (54) wherein said fibers (83) contained in said friction material (34) at said trailing edge (55) are positioned in a direction toward said core plate (42), said cutting in said step (e) being a common cut along said trailing edge (55) of a leading segment (54) and said leading edge (57) of an immediately following segment (54) whereby said formation of said segment (54) is substantially scrapless with respect to said friction material (34);

(f) positioning said segment (54) on said adhesive (43) of said core plate (42) wherein said fibers (83) at said leading and trailing edges (57,55) are positioned in said adhesive (43);

(g) rotating said core plate (42); and (h) repeating said steps (a) through (g) until a predetermined number of said segments (54) are positioned on said core plate (42).

2. The method of claim 1, wherein said supply of friction material (34) is a roll of friction material that has been preslit to a predetermined width.

3. The method of claim 1, wherein said core plate (42) is positioned on a rotatable platform (18).

4. The method of claim 3, wherein said rotatable platform (18) is positioned on means for moving said platform.

5. The method of claim 1, wherein said friction material (34) is fed to said die (24) by at least one guided pinch roll (36, 38) at a predetermined rate of speed and distance.

6. The method of claim 1, wherein at least one groove (56) is formed into each said segment (54) of said friction material (34) prior to said step (f).

7. The method of claim 6, wherein said groove (56) is substantially straight.

8. The method of claim 6, wherein said groove (56) is substantially asymmetrical.

9. The method of claim 6, wherein said groove (56) is substantially curved.

10. The method of claim 6, wherein said groove (56) is open.

11. The method of claim 6, wherein said groove (56) is closed.

* * * * *